(12) United States Patent  
Nojiri et al.

(10) Patent No.: US 9,442,325 B2  
(45) Date of Patent: Sep. 13, 2016

(54) LIQUID CRYSTAL DISPLAY DEVICE AND METHOD OF MANUFACTURING THE SAME

(71) Applicants: Isao Nojiri, Tokyo (JP); Toshiro Taniguchi, Kumamoto (JP)

(72) Inventors: Isao Nojiri, Tokyo (JP); Toshiro Taniguchi, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 132 days.

(21) Appl. No.: 13/794,623

(22) Filed: Mar. 11, 2013

(65) Prior Publication Data

US 2013/0271717 A1    Oct. 17, 2013

(30) Foreign Application Priority Data

Apr. 13, 2012 (JP) ................. 2012-091746

(51) Int. Cl.
G02F 1/1341 (2006.01)
G02F 1/1339 (2006.01)

(52) U.S. Cl.
CPC ........... *G02F 1/1339* (2013.01); *G02F 1/1341* (2013.01)

(58) Field of Classification Search
CPC ........................... G02F 1/1341; G02F 1/1339
See application file for complete search history.

(56) References Cited

U.S. PATENT DOCUMENTS

| | | | |
|---|---|---|---|
| 5,929,959 A | 7/1999 | Iida et al. | |
| 2002/0075439 A1* | 6/2002 | Uehara | 349/149 |
| 2002/0163614 A1* | 11/2002 | Hinata | G02F 1/1339 349/139 |
| 2005/0088603 A1* | 4/2005 | Hong | 349/153 |
| 2009/0015779 A1* | 1/2009 | Ohashi | 349/154 |
| 2009/0033858 A1* | 2/2009 | Yamamoto | G02F 1/1341 349/154 |
| 2009/0237607 A1* | 9/2009 | Hosokawa | 349/153 |
| 2011/0043743 A1* | 2/2011 | Kamada et al. | 349/153 |

FOREIGN PATENT DOCUMENTS

| | | |
|---|---|---|
| JP | 60-247620 A | 12/1985 |
| JP | 09-090385 A | 4/1997 |
| JP | 10-062793 A | 3/1998 |
| JP | 2000-029048 A | 1/2000 |
| JP | 2004-272013 A | 9/2004 |
| JP | 2008-052095 A | 3/2008 |

OTHER PUBLICATIONS

Jin Choi et al.; "A Compact and Cost-efficient TFT-LCD through the Triple-Gate Pixel Structure"; pp. 274-276; SID 06 Digest.

* cited by examiner

*Primary Examiner* — Edward Glick
*Assistant Examiner* — Anthony G Quash
(74) *Attorney, Agent, or Firm* — Studebaker & Brackett PC (57) ABSTRACT

The present invention includes liquid crystal held between an array substrate including a display area and a color filter substrate, a seal material pasting the both substrates together outside in plan view of the display area, and column spacers between the both substrates. The seal material includes a seal periphery surrounding the display area, and seal extending portions forming an injection port of the liquid crystal by extending the seal periphery outside in plan view of the display area from both end of a partial opening. The seal periphery includes no spacer therein, and the seal extending portions include spacers therein.

7 Claims, 6 Drawing Sheets

FIG. 10

LIQUID CRYSTAL DISPLAY DEVICE AND METHOD OF MANUFACTURING THE SAME

BACKGROUND OF THE INVENTION

1. Field of the Invention

The present invention relates to a liquid crystal display device and a method of manufacturing a liquid crystal display device, and more particularly to adjustment of a liquid crystal injection port in a process of manufacturing the liquid crystal display device.

2. Description of the Background Art

Heretofore, in a liquid crystal display device, electrodes are formed, liquid crystal is sealed between insulating substrates arranged to be opposed to each other by a seal material, and liquid crystal molecules are aligned in a predetermined direction by utilizing an alignment film formed on the electrodes.

A signal voltage driving the liquid crystal is applied between the electrodes formed on the insulating substrate, thereby controlling alignment of the liquid crystal for displaying.

The seal material sealing the liquid crystal includes a seal periphery formed in a rectangle to surround the liquid crystal, and seal extending portions extending from the seal periphery to an end surface of a liquid crystal display panel. The seal extending portions form an injection port for injecting the liquid crystal between the insulating substrates. The injection port is sealed by a sealing material after the liquid crystal is injected between the insulating substrates.

Liquid crystal display devices having gate line driving circuits built-in, which are configured by amorphous silicon thin film transistors (hereinafter referred to a-Si TFTs: amorphous thin film transistors), are employed for screens of notebook computers, personal digital assistants (PDAs), portable multimedia players (PMPs), personal navigation devices (PNDs), for example, which are easy to have large areas and have high productivity (see Jin Young Choi, Jin Jeon, Jong Heon Han, Seob Shin, Se Chun Oh, Jun Ho Song, Kee Han Uh, and Hyung Guel Kim, "A Compact and Cost-efficient TFT-LCD through the Triple-Gate Pixel Structure", pp 274 to pp 276, SID '06 DIGEST).

In the gate line driving circuit, an area where wiring patterns having different potential intersect exists in order to configure a circuit.

Here, a frame of the liquid crystal display panel is narrowed, namely, at least a part of the gate line driving circuit needs to be arranged below the seal periphery surrounding the liquid crystal display panel in order to reduce an area where liquid crystal display is not performed.

Although seal-inside spacers such as microrods and silica spheres are generally mixed into the seal material in order to form a gap of a liquid crystal cell, in a case where the gate line driving circuit is arranged below the seal periphery mixed with the seal-inside spacers, the circuit pattern is pressed and broken by the seal-inside spacers, and an electric short-circuit occurs. Particularly, when a soft metal wire such as Al is employed as the gate line driving circuit, this phenomenon is prominent.

Therefore, it is impossible to arrange the gate line driving circuit below the seal material in this situation. However, as this measure, there is a method of using only column spacers (gap holders) forming the gap of the liquid crystal cell without the seal-inside spacers such as microrods and silica spheres.

However, even when the cell gap is formed by only the column spacers without the seal-inside spacers, there are problems as follows.

In a general method of manufacturing a liquid crystal display device, a color filter substrate formed with color filters, and an array substrate formed with transistor devices, capacitative elements, electrode wires and the like are prepared, and pasted together to assemble a liquid crystal cell. Thereafter, the liquid crystal cell is cut into a predetermined size, and liquid crystal is injected into the liquid crystal cell.

This liquid crystal injection process employs a vacuum injection method, in which an empty liquid crystal cell is evacuated in a vacuum container, an injection port of the evacuated empty liquid crystal cell is then immersed in a liquid crystal material, an area therearound is thereafter returned to ordinary pressure, and the liquid crystal material is injected into the liquid crystal cell.

In a case where the cell gap of the liquid crystal cell is formed by only the column spacers, even when the cell gap can be successfully formed without narrowing the injection port in panel pasting, there is a problem of increasing evacuation time due to the following reason.

In the vacuum injection method, after the liquid crystal cell is prepared in the vacuum container, and the vacuum container is evacuated by a vacuum pump to become a vacuum state, an injection port side of the liquid crystal cell is immersed at several millimeters in the liquid crystal material.

Next, the vacuum container in the vacuum state is gradually returned to atmospheric pressure by leak, and the liquid crystal material is injected into the liquid crystal cell from the injection port by action of pressure difference between atmospheric pressure and air pressure in the liquid crystal cell, and action of capillarity of the liquid crystal.

At the time of completing injection of the liquid crystal material, a sealing material is applied to the injection port, and the sealing material is subjected to ultraviolet curing or thermal oxidation, thereby sealing the injection port.

When evacuating to become a vacuum state, a vacuum degree of inside of the vacuum container is more rapidly increased than that of the empty liquid crystal cell. Consequently, a thickness of a center of the liquid crystal panel greatly increases compared to that at ordinary pressure. At this time, stress employing the seal periphery as a supporting point is applied to the whole liquid crystal panel, and consequently, the injection port narrows. There is a problem that evacuation time increases when the liquid crystal material is injected from the narrowed injection port.

When the inside of the vacuum container is returned to ordinary pressure, and the liquid crystal material is injected inside the liquid crystal panel in a state where the injection port is immersed in the liquid crystal material, the inside of the vacuum container is more rapidly returned to ordinary pressure than the inside of the liquid crystal panel, and the thickness of the center of the liquid crystal panel reduces. Consequently, the injection port is widened, and injection time of the liquid crystal material does not increase.

SUMMARY OF THE INVENTION

An object of the present invention is to provide a liquid crystal display device capable of suppressing an increase in injection time of a liquid crystal material due to the narrowed injection port, and a method of manufacturing the liquid crystal display device.

A liquid crystal display device according to the present invention includes an array substrate including a display area having a plurality of pixel electrodes, an opposed substrate arranged to be opposed to the array substrate, liquid crystal held between the array substrate and the opposed substrate, a first seal material pasting the array substrate and the opposed substrate together outside in plan view of the display area, and a gap holder between the array substrate and the opposed substrate.

The first seal material includes a seal periphery surrounding the display area, and seal extending portions forming an injection port of the liquid crystal by partially opening the seal periphery and extending outside in plan view of the display area from both ends of the opening.

The seal periphery includes no spacer therein, and the seal extending portions include spacers therein.

A first method of manufacturing a liquid crystal display device according to the present invention is a method of manufacturing the aforementioned liquid crystal display device, and includes the steps of (a) forming the seal periphery on one of the array substrate and the opposed substrate, and forming the seal extending portions on the other substrate; and (b) pasting the array substrate and the opposed substrate together with the seal periphery and the seal extending portions.

A second method of manufacturing a liquid crystal display device according to the present invention is a method of manufacturing the aforementioned liquid crystal display device, and includes the steps of (a) forming the seal periphery and the seal extending portions on one of the array substrate and the opposed substrate, and applying transfer materials on the other substrate; and (b) pasting the array substrate and the opposed substrate together with the seal periphery, the seal extending portions, and the transfer materials.

According to the liquid crystal display device of the present invention, the seal extending portions having the seal-inside spacers can withstand stress applied to the injection port in injection of the liquid crystal material, and the injection port can be prevented from narrowing. Therefore, the increase of the injection time of the liquid crystal material due to the narrowed injection port can be suppressed.

According to the first method of manufacturing a liquid crystal display device of the present invention, since the seal material is applied to the both substrates, a plurality of seal printing plates are not required, and an increase in cost and manufacturing tact can be suppressed.

According to the second method of manufacturing a liquid crystal display device of the present invention, since the transfer materials can be applied to the seal extending portions in accordance with a step of applying the transfer materials originally used for the purpose of connection of the transfer electrodes and the opposed electrodes, a new manufacturing process is not added, and an increase in cost and manufacturing tact can be suppressed.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 10:
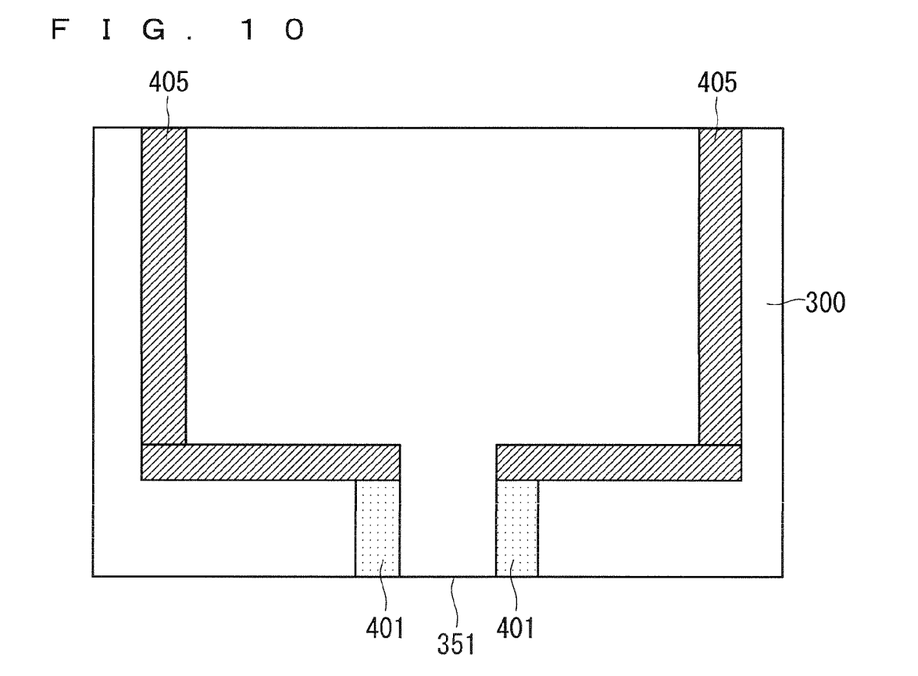
FIG. 10 is a detail view of a surrounding area of an injection port of a liquid crystal display device according to an underlying technique of the present invention.

A detail view of a surrounding area of an injection port of a liquid crystal material of a liquid crystal display device is shown in FIG. 10 as an underlying technique of the present invention.

As shown in FIG. 10, a seal material sealing liquid crystal includes a seal periphery 405 surrounding the liquid crystal and formed in a rectangle, and seal extending portions 401 extending from the seal periphery 405 to an end surface of a liquid crystal display panel 300, and the seal extending portions 401 form an injection port 351 for injecting the liquid crystal between insulating substrates. The injection port 351 is sealed by a sealing material after injecting the liquid crystal between the insulating substrates (not shown).

Seal-inside spacers such as microrods and silica spheres are generally mixed into the seal material for gap formation of a liquid crystal cell shown in FIG. 10. When a gate line driving circuit is arranged under the seal periphery 405 mixed with the seal-inside spacers, the seal-inside spacers press and break a circuit pattern, thereby causing an electric short-circuit. Particularly, when a soft metal wire such as Al is employed as the gate line driving circuit, this phenomenon is prominent.

Therefore, a cell gap can be formed by using only column spacers without the seal-inside spacers. However, even in this case, the injection port becomes narrow in a process of a vacuum injection method of the liquid crystal material. When the liquid crystal material is injected from the narrowed injection port, evacuation time is increased.

In view of the aforementioned problems, a liquid crystal display device capable of suppressing the increase of injection time of the liquid crystal material due to the narrowed injection port is specifically shown in the following each preferred embodiment.

<First Preferred Embodiment>
<Configuration>

A preferred embodiment of the present invention is hereinafter described with reference to the drawings. In order to avoid redundant description, the same reference numerals denote components having the same or corresponding functions in respective drawings.

Figure 1:
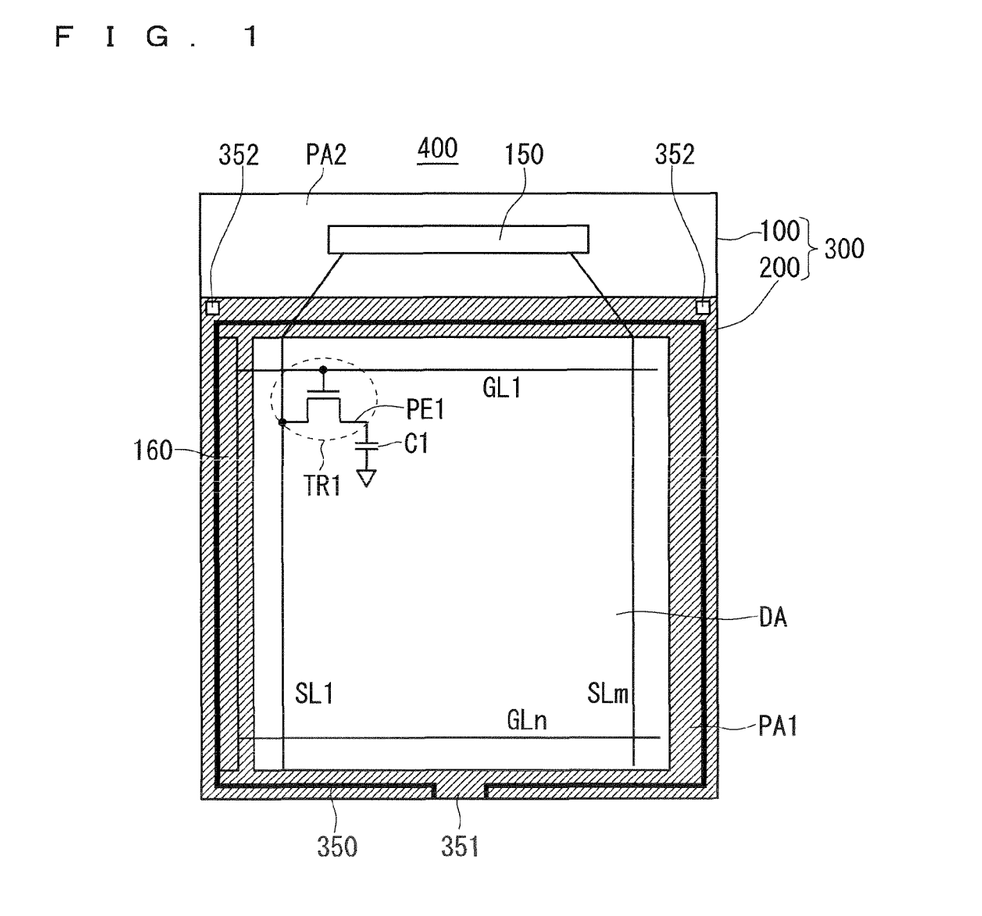
FIG. 1 is a diagram showing a structure of a liquid crystal display device according to a preferred embodiment of the present invention.

FIG. 1 is a plan view showing a whole structure of a liquid crystal display device of the present preferred embodiment.

As shown in FIG. 1, a liquid crystal display device 400 according to the present preferred embodiment includes a liquid crystal display panel 300, a source line driver IC 150 included in the liquid crystal display panel 300 and outputting a driving signal to the liquid crystal display panel 300, a gate line driving circuit 160 included in the liquid crystal display panel 300 and outputting a driving signal to the liquid crystal display panel 300 similarly.

The liquid crystal display panel 300 includes an array substrate 100, a color filter substrate 200 as an opposed substrate arranged to face the array substrate 100, a liquid crystal layer (not shown) interposed between the array substrate 100 and the color filter substrate 200, and a seal material 350 as a first seal material holding the liquid crystal layer, and bonding the array substrate 100 and the color filter substrate 200.

The array substrate 100 includes at least a plurality of gate lines (GL1 to GLn) arranged on an insulating substrate, a plurality of source lines (SL1 to SLm) insulated from and intersecting with the gate lines, a plurality of pixel electrodes PE (not shown) arranged on intersecting portions of the gate lines (GL1 to GLn) and the source lines (SL1 to SLm), and a thin film transistor (TFT) driving the pixel electrodes PE.

The injection port 351 for injecting liquid crystal is formed in a part of the seal material 350. The column spacers forming the cell gap between the array substrate 100 and the color filter substrate 200 are evenly arranged on the color filter substrate 200 (not shown).

Respective outputs of the source line driver IC 150 are connected to the source lines (SL1 to SLm), and source driving signals (first driving signals) are applied to the respective source lines (SL1 to SLm).

Similarly, respective outputs of the gate line driving circuit 160 are connected to the gate lines (GL1 to GLn), and gate driving signals (second driving signals) are applied to the respective gate lines (GL1 to GLn).

Opposed electrodes CE (not shown) are formed on a surface of the color filter substrate 200, opposed to the array substrate 100, and electric fields generated between the pixel electrodes PE and the opposed electrodes control light transmittance of the liquid crystal layer.

Auxiliary capacitors C are arranged between drain electrodes and common electrodes (not shown) of TFTs for respective pixels.

Although FIG. 1 shows a pixel electrode PE1, a TFT (TR1), and an auxiliary capacitors C1 arranged on the intersecting portion of the first gate line GL1 and the first source line SL1 among a plurality of pixels arranged in the form of a matrix, corresponding to a display area DA displaying an image, particularly a connection diagram thereof, other pixels have similar configurations.

The liquid crystal display panel 300 includes the display area DA, a first peripheral area PA1 arranged to surround this display area DA, and a second peripheral area PA2 adjacent to the outside of this first peripheral area PAL In the second peripheral area PA2, the array substrate 100 extends to be longer than the color filter substrate 200 (upward in an example of FIG. 1), and is mounted with the source line driver IC 150.

The first driving signals output from the source line driver IC 150 include first to m-th source driving signals, and are applied to first to m-th source lines (SL1 to SLm) through a plurality of source line lead wires formed in the second peripheral area PA2.

In the array substrate 100, first to n-th gate lines (GL1 to GLn), and the first to m-th source lines (SL1 to SLm) are formed corresponding to the display area DA.

Among the plurality of TFTs, a gate electrode of the first TFT (TR1) is electrically connected to the first gate line GL 1, and a source electrode of the first TFT (TR1) is electrically connected to the first source line SL1.

The drain electrode of the TFT (TR1) is connected to the first pixel electrode PE1 and the first auxiliary capacitor C1 among the plurality of pixel electrodes.

In the color filter substrate 200, a color filter layer including red, green, blue pixels (R, G, B), and a light shielding layer are arranged corresponding to the display area DA (not shown).

Transparent electrodes are provided on the color filter layer and the light shielding layer. The transparent electrodes apply a voltage to the liquid crystal layer as opposed electrodes to the pixel electrodes (not shown).

The column spacers controlling a thickness (gap) of the cell are formed on the transparent electrodes (not shown).

Transfer electrodes 352 are provided further outside of the seal material arranged at the periphery on the array substrate 100. The transfer electrodes 352 are connected to a common potential terminal existing adjacent to a substrate edge of the second peripheral area PA2 by signal wires on the array substrate 100 (not shown).

The transfer electrodes 352 are coated with a transfer material as a conductive member formed from conducting particles, connected to the transparent electrodes on the color filter substrate 200, and apply common potential to the transparent electrodes of the color filter substrate 200.

On the other hand, the gate line driving circuit 160 simultaneously generated through the same process as a forming process of the plurality of TFTs and the display area DA is provided on a side of the frame-like first peripheral area PA1 (left side in FIG. 1).

A part of the gate line driving circuit 160 is arranged below the seal material 350. The gate line driving circuit 160 is electrically connected to the first to n-th gate lines (GL1 to GLn) formed in the display area DA.

The second driving signals output from the gate line driving circuit 160 include first to n-th gate signals (OUT1 to OUTn), and the first to n-th gate signals (OUT1 to OUTn) are applied to the first to n-th gate lines (GL1 to GLn).

The color filter substrate 200 and the array substrate 100 have a surface formed with the color filter layer or the opposed electrodes CE and a surface formed with the display area DA which are arranged to be opposed, and hold the liquid crystal layer therebetween together with the seal material 350 fixing the two substrates.

Figure 2:
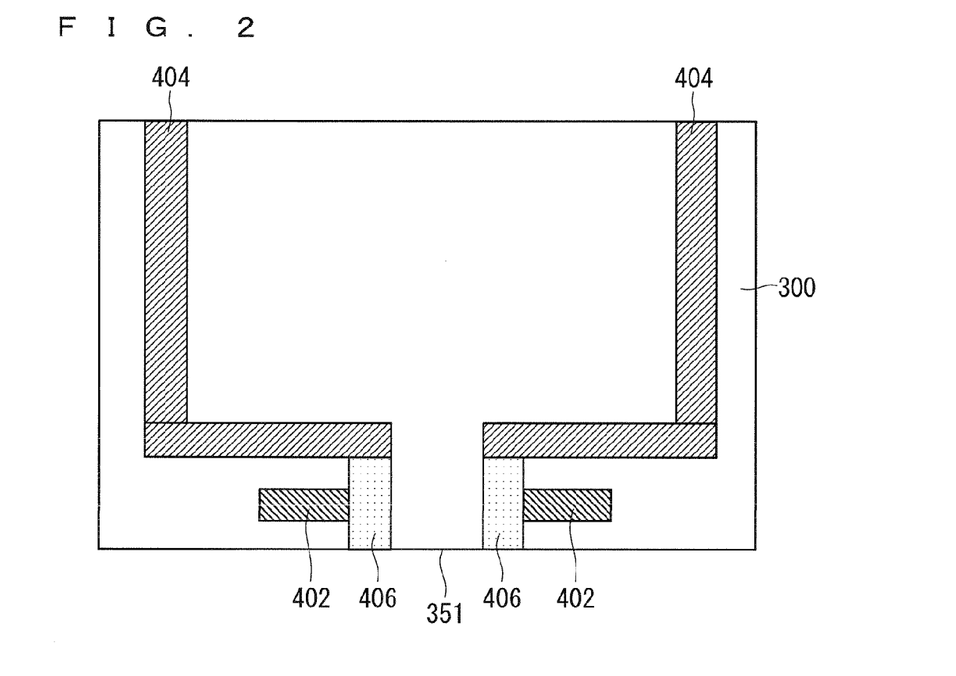
FIG. 2 and FIG. 3 each are a detail view of a surrounding area of an injection port of the liquid crystal display device according to the preferred embodiment of the present invention.

FIG. 2 is a detail view of the surrounding area of the injection port 351 of the liquid crystal display device according to the present preferred embodiment, shown in FIG. 1. This figure shows the detail of the seal material 350 of FIG. 1.

As shown in FIG. 2, a seal periphery 404 formed to surround the display area along an outer frame of the liquid crystal display panel 300, seal extending portions 406 extending from an opening of the seal periphery 404 toward the outer frame of the liquid crystal display panel 300, and seal auxiliary portions 402 continuous from the seal extending portions 406 and arranged parallel to the seal periphery 404 are formed. While no seal periphery 404 is formed on a portion held between a pair of the seal extending portions 406, the injection port 351 is formed on the portion. The seal auxiliary portions 402 are formed to extend outside in plan view of the injection port 351. Although not shown in the drawing, the column spacers (gap holders) are arranged at intervals between the array substrate 100 and the color filter substrate 200.

No seal-inside spacer exists in the seal extending portions 406 and the seal periphery 404.

Thus, the seal auxiliary portions 402 are formed on the injection port 351, so that a portion as a supporting point of force expanding a center of the liquid crystal display panel 300 in evacuation is dispersed at a plurality of places when the liquid crystal material is injected and stress applied to the injection port 351 can be relaxed. Therefore, the increase of evacuation time in injection of the liquid crystal material can be suppressed.

Longer seal auxiliary portions 402 exert greater effects, and may be formed to extend to the whole side where the injection port 351 exists, for example.

<Effects>

According to the preferred embodiment of the present invention, in the liquid crystal display device, the seal extending portions 406 include no spacer therein, and include the seal auxiliary portions 402 extending parallel to the side having the opening of the seal periphery 404 outside in plan view of the injection port 351 of the seal extending portions 406.

According to the liquid crystal display device, the seal auxiliary portions 402 disperse the portion as the supporting point of the force expanding the center of the liquid crystal display panel 300 at the plurality of places when the liquid crystal material is injected, and therefore can relax the stress applied to the injection port 351. Therefore, the increase of evacuation time in injection of the liquid crystal material can be suppressed.

<Second Preferred Embodiment>

<Configuration>

Figure 3:
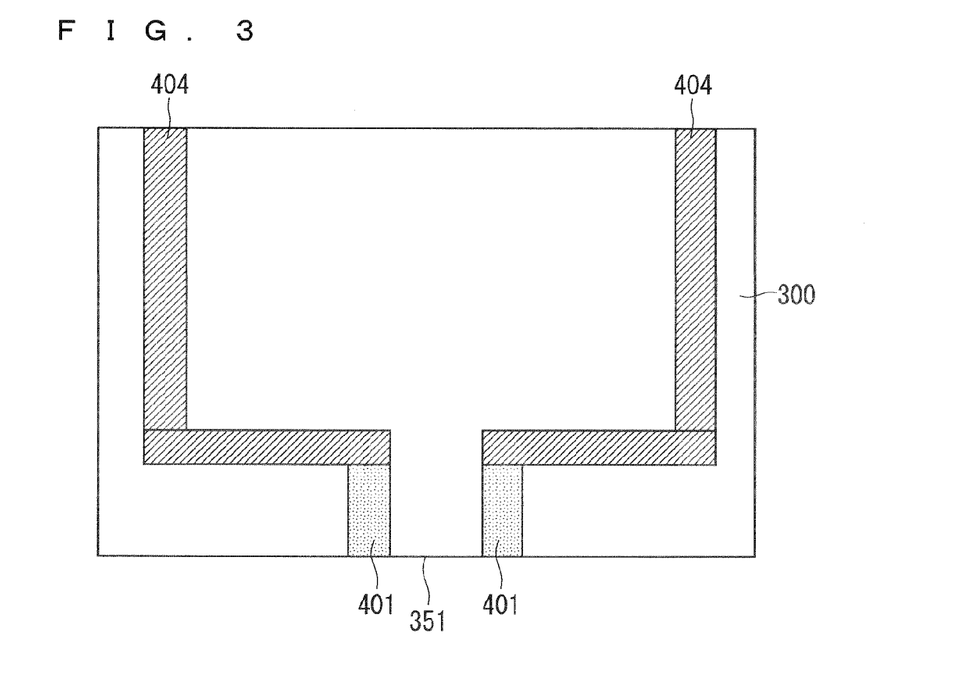

FIG. 3 shows a detail view of a surrounding area of an injection port 351 of a liquid crystal display device according to the preferred embodiment of the present invention. This figure shows the detail of a seal material 350 of FIG. 1.

In the present preferred embodiment, seal-inside spacers such as microrods and silica spheres do not exist in a seal periphery 404, but exist only in seal extending portions 401.

By arranging the seal-inside spacers in the seal extending portions 401, it is possible to withstand stress applied to the injection port 351 with force expanding a center of the liquid crystal display panel 300 in evacuation when the liquid crystal material is injected, and to prevent the injection port 351 from narrowing. Therefore, the increase of evacuation time in injection of the liquid crystal material can be suppressed.

Since no circuit pattern exists on portions, in which the seal extending portions 401 are arranged, of an array substrate 100, no problem of an electric short-circuit due to the seal-inside spacers occurs.

Heights of the seal extending portions 401 (i.e., diameters of the seal-inside spacers such as microrods and silica spheres) where the seal-inside spacers exist should be equal to a cell gap, and do not have to be larger than the cell gap in order to particularly expand the injection port 351.

<Manufacturing Method>

Figure 4:
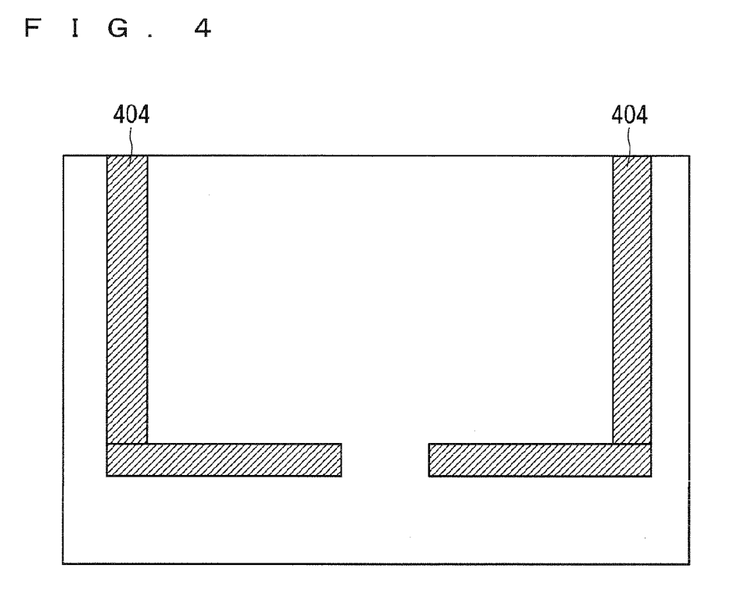
FIG. 4 and FIG. 5 each are a diagram for illustrating a method of manufacturing the liquid crystal display device according to the preferred embodiment of the present invention.
Figure 5:
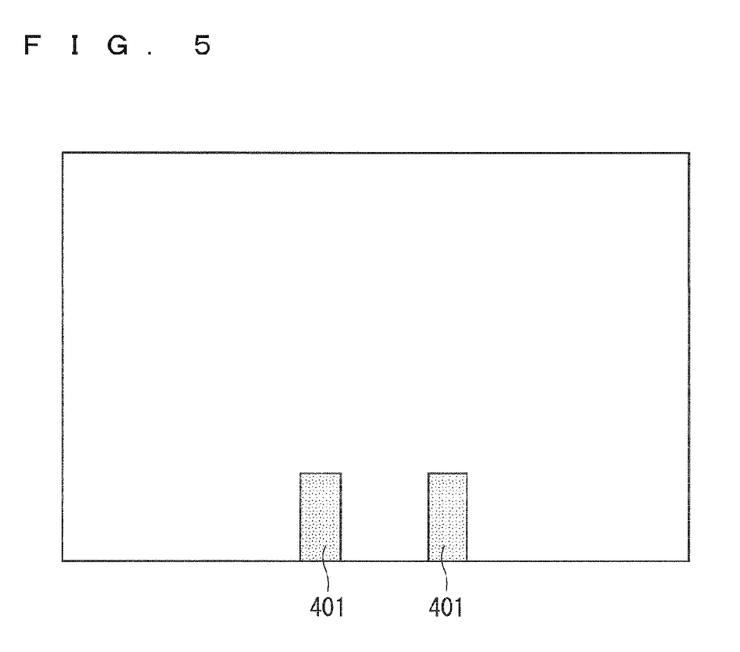

The liquid crystal display device according to the present preferred embodiment is prepared as shown in FIG. 4 and FIG. 5.

When opposed insulating substrates (the array substrate 100 and the color filter substrate 200) are pasted together, the seal material 350 is applied.

At this time, the seal periphery 404 is applied on one of the substrates by seal printing (see FIG. 4).

The seal extending portions 401 mixed with the seal-inside spacers therein are applied on the other substrate with a dispenser (constant liquid discharge device) (see FIG. 5).

Thus, the both substrates applied with the seal materials 350 are pasted together, so that a desired seal pattern is formed. In this method, a plurality of seal printing plates are not required, and an increase in costs and manufacturing tact can be suppressed.

While areas where the seal-inside spacers are arranged are only the seal extending portions 401 in FIG. 3, seal materials 407 (second seal materials) may be provided outside the injection port 351 of the seal extending portions 401 (see FIG. 6) in addition to the seal extending portions 401, or the seal auxiliary portions 402 shown in FIG. 2 may be further provided.

<Effects>

According to the preferred embodiment of the present invention, the liquid crystal display device includes the array substrate 100 including a display area, the color filter substrate 200 as an opposed substrate, liquid crystal held between the array substrate 100 and the color filter substrate 200, the seal material 350 as a first seal material pasting the array substrate 100 and the color filter substrate 200 together, provided outside in plan view of the display area, and column spacers (gap holders) formed on areas other than areas, in which the seal-inside spacers are arranged, between the array substrate 100 and the color filter substrate 200.

The seal material 350 includes the seal periphery 404 surrounding the display area, and the seal extending portions 401 forming the injection port 351 of the liquid crystal by partially opening the seal periphery 404 and extending outside in plan view of the display area from both ends of the opening.

While the seal periphery 404 includes no spacer therein, the seal extending portions 401 include spacers therein.

According to such a liquid crystal display device, the seal extending portions 401 having the seal-inside spacers can withstand stress applied to the injection port 351 with force expanding a center of the liquid crystal display panel 300 in injection of the liquid crystal material, and the injection port 351 can be prevented from narrowing. Therefore, the increase of evacuation time in injection of the liquid crystal material can be suppressed.

Figure 6:
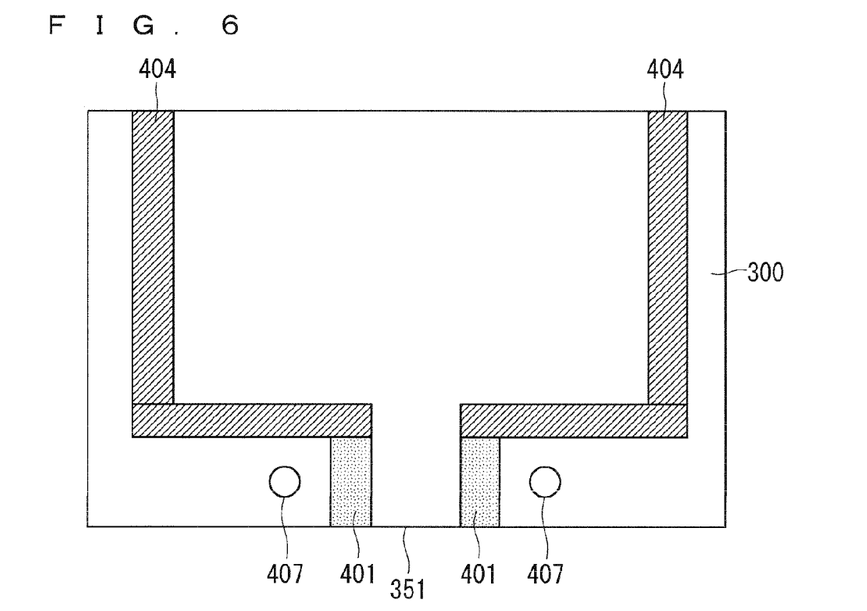
FIG. 6 and FIG. 7 each are a detail view of the surrounding area of the injection port of the liquid crystal display device according to the preferred embodiment of the present invention.

According to the preferred embodiment of the present invention, the liquid crystal display device includes the seal materials 407 as the second seal materials formed outside in plan view of the injection port 351 of the seal extending portions 406 and including spacers therein.

According to such a liquid crystal display device, provision of the seal materials 407 supports that the seal extending portions 401 having the seal-inside spacers can withstand stress applied to the injection port 351 in injection of the liquid crystal material, and the injection port 351 can be prevented from narrowing. Therefore, the increase of evacuation time in injection of the liquid crystal material can be suppressed.

According to the preferred embodiment of the present invention, a method of manufacturing the liquid crystal display device includes the steps of (a) forming the seal periphery 404 on one of the array substrate 100 and the color filter substrate 200 as the opposed substrate, and forming the seal extending portions 401 on the other substrate, and (b) pasting the array substrate 100 and the color filter substrate 200 together with the seal periphery 404 and the seal extending portions 401.

According to such a method of manufacturing the liquid crystal display device, since the seal material 350 is applied to the both substrates, a plurality of seal printing plates are not required, and an increase in cost and manufacturing tact can be suppressed.

Third Preferred Embodiment

Configuration

Figure 7:
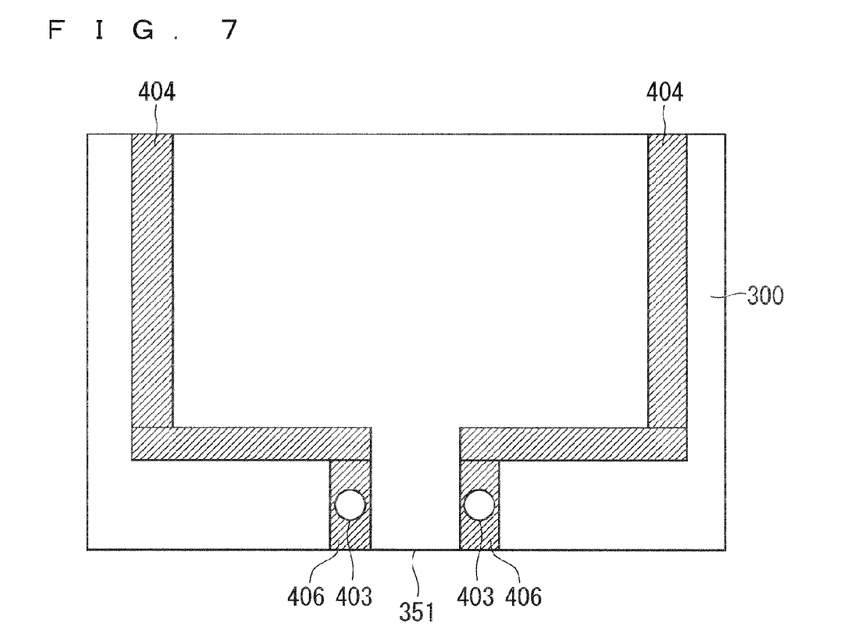

FIG. 7 is a detail view of a surrounding area of an injection port 351 of a liquid crystal display device according to the preferred embodiment of the present invention. This figure shows the detail of a seal material 350 of FIG. 1.

In the present preferred embodiment, while seal-inside spacers such as microrods and silica spheres do not exist on a seal periphery 404 and seal extending portions 406, transfer materials 403 originally used for the purpose of connection of transfer electrodes and opposed electrodes are applied to the seal extending portions 406. The transfer materials 403 include conductive members, and the same materials as the seal material are used.

By applying the transfer materials 403 to the seal extending portions 406, it is possible to withstand stress applied to the injection port 351 with force expanding a center of a liquid crystal display panel 300 in evacuation when the liquid crystal material is injected, and to prevent the injection port 351 from narrowing. Therefore, the increase of evacuation time in injection of the liquid crystal material can be suppressed.

Since no circuit pattern exists on portions, in which the seal extending portions 406 are arranged, of an array substrate 100, no problem of an electric short-circuit due to the seal-inside spacers occurs.

Heights of the seal extending portions 406 where the transfer materials 403 are arranged should be equal to a cell gap, and do not have to be larger than the cell gap in order to particularly expand the injection port 351.

Manufacturing Method

Figure 8:
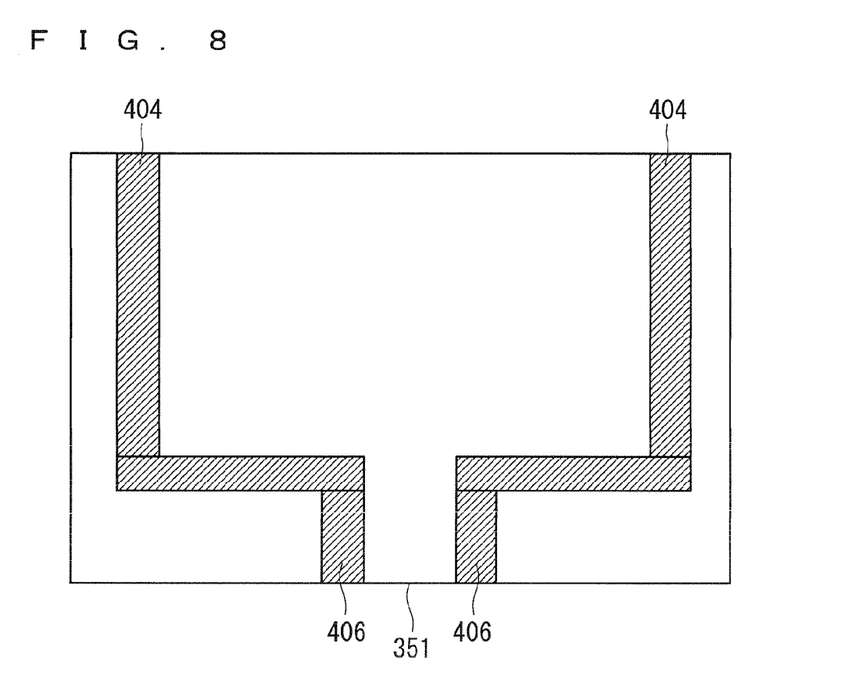
FIG. 8 and FIG. 9 each are a diagram for illustrating a method of manufacturing the liquid crystal display device according to the preferred embodiment of the present invention.
Figure 9:
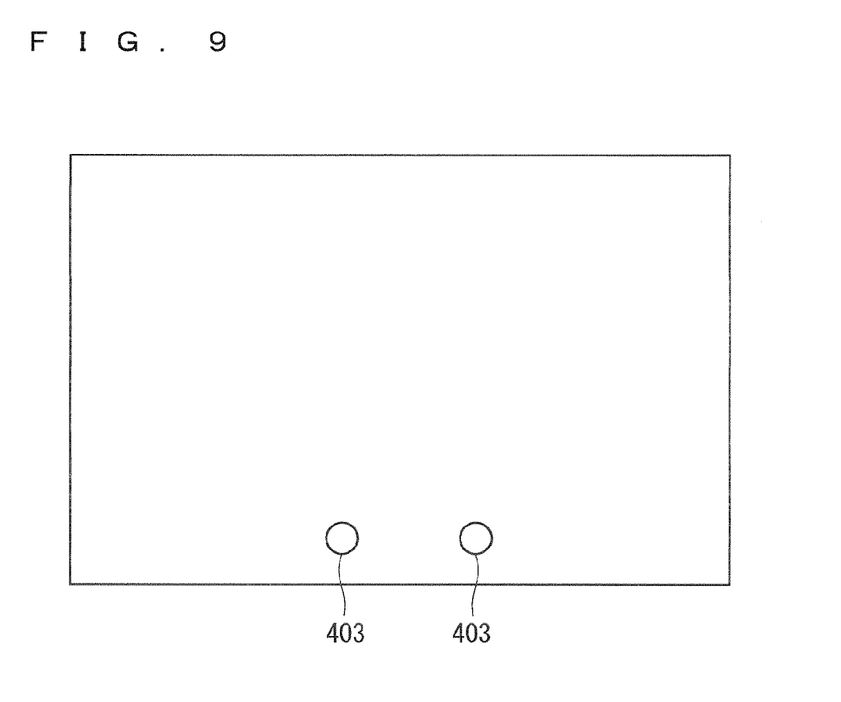

The liquid crystal display device according to the present preferred embodiment is prepared as shown in FIG. 8 and FIG. 9.

When opposed insulating substrates (the array substrate 100 and a color filter substrate 200) are pasted together, the seal material 350 is applied.

At this time, the seal periphery 404 and the seal extending portions 406 are applied on one of the substrates by seal printing (see FIG. 8).

The transfer materials 403 are applied on the other substrate (generally array substrate) with a dispenser (constant liquid discharge device). On the other hand, the transfer materials 403 are applied also on the seal extending portions 406 (see FIG. 9).

Thus, the both substrates applied with the seal materials 350 are pasted together, so that a desired seal pattern is formed. In this method, a new manufacturing process is not added, and an increase in costs and manufacturing tact can be suppressed.

While areas where the seal-inside spacers are arranged are only the seal extending portions in FIG. 6, the seal-inside spacers may be provided in surrounding areas of the seal extending portions 406 in addition to the seal extending portions 406. Additionally, the seal-inside spacers may be provided in the seal auxiliary portions 402 shown in FIG. 2 (may be applied at a plurality of points adjacent to the same portion).

Silver paste, conducting particles configured by coating gold on resin balls, and the like are employed as conductive members.

Effects

According to the preferred embodiment of the present invention, in liquid crystal display device, the seal extending portions 406 do not include spacers therein, but include the transfer materials 403.

According to such a liquid crystal display device, the seal extending portions 406 can withstand stress applied to the injection port 351 with force expanding a center of the liquid crystal display panel 300 in evacuation when the liquid crystal material is injected, by including the transfer materials 403, and the injection port 351 can be prevented from narrowing. Therefore, the increase of evacuation time in injection of the liquid crystal material can be suppressed.

According to the preferred embodiment of the present invention, a method of manufacturing the liquid crystal display device includes the steps of (a) forming the seal periphery 404 and the seal extending portions 406 on one of the array substrate 100 and the color filter substrate 200 as the opposed substrate, and applying the transfer materials 403 to the other substrate, and (b) pasting the array substrate 100 and the color filter substrate 200 together with the seal periphery 404, the seal extending portions 406, and the transfer materials 403.

According to such a method of manufacturing the liquid crystal display device, since the transfer materials 403 can be applied to the seal extending portions 406 in accordance with a step of applying the transfer materials 403 originally used for the purpose of connection of the transfer electrodes and the opposed electrodes, a new manufacturing process is not added, and an increase in cost and manufacturing tact can be suppressed.

The present invention can be made by free combination of the respective preferred embodiments, modification of any components of the respective preferred embodiments, or omission of any components of the respective preferred embodiments, within the scope of the invention.

While an amorphous silicon thin film transistor is used as the gate line driving circuit in the present preferred embodiment, a low temperature polysilicon transistor or other organic semiconductor transistor may be used.

The present invention is also applicable for a case where a gap is formed by only column spacers without seal-inside spacers such as microrods and silica spheres, even when the gate line driving circuit is not included.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device comprising:
   an array substrate including a display area having a plurality of pixel electrodes;
   an opposed substrate arranged to be opposed to said array substrate;
   liquid crystal held between said array substrate and said opposed substrate;
   a first seal material pasting said array substrate and said opposed substrate together outside in plan view of said display area; and
   a gap holder between said array substrate and said opposed substrate,
   wherein said first seal material includes:
   a seal periphery surrounding said display area; and
   seal extending portions forming an injection port of said liquid crystal by partially opening said seal periphery and extending outside in plan view of said display area from both ends of the opening,
   said seal periphery includes no seal-inside spacer therein, and
   said seal extending portions include seal-inside spacers therein.

2. The liquid crystal display device according to claim 1, further comprising second seal materials formed outside in plan view of said injection port of said seal extending portions, and including seal-inside spacers therein.

3. The liquid crystal display device according to claim 1, wherein a gate line driving circuit is formed on said array substrate.

4. The liquid crystal display device according to claim 3, wherein said gate line driving circuit is formed by an amorphous silicon transistor.

5. The liquid crystal display device according to claim 1, wherein said seal-inside spacers comprise microrods or silica spheres.

6. A method of manufacturing a liquid crystal display device including:
- an array substrate including a display area having a plurality of pixel electrodes;
- an opposed substrate arranged to be opposed to said array substrate;
- liquid crystal held between said array substrate and said opposed substrate;
- a first seal material pasting said array substrate and said opposed substrate together outside in plan view of said display area; and
- a gap holder between said array substrate and said opposed substrate, wherein said first seal material includes:
- a seal periphery surrounding said display area; and
- seal extending portions forming an injection port of said liquid crystal by partially opening said seal periphery and extending outside in plan view of said display area from both ends of the opening, said seal periphery includes no seal-inside spacer therein, and said seal extending portions include seal-inside spacers therein, the method comprising the steps of:
(a) forming said seal periphery on one of said array substrate and said opposed substrate, and forming said seal extending portions on the other substrate; and
(b) pasting said array substrate and said opposed substrate together with said seal periphery and said seal extending portions.

7. The method of manufacturing the liquid crystal display device according to claim 6, wherein said seal-inside spacers comprise microrods or silica spheres.

* * * * *